United States Patent [19]

Thue

[11] Patent Number: 5,115,247

[45] Date of Patent: May 19, 1992

[54] FREQUENCY MODULATED, PHASE CODED RADAR

[75] Inventor: Baard H. Thue, Columbus Township, Anoka County, Minn.

[73] Assignee: Honeywell Inc., Minneapolis, Minn.

[21] Appl. No.: 423,489

[22] Filed: Oct. 12, 1989

Related U.S. Application Data

[63] Continuation-in-part of Ser. No. 156,155, Feb. 16, 1988, abandoned.

[51] Int. Cl.⁵ .................. G01S 13/28; G01S 13/34; G01S 13/36
[52] U.S. Cl. ................................. 342/201; 342/132
[58] Field of Search ............... 342/201, 131, 132, 137, 342/195

[56] References Cited

U.S. PATENT DOCUMENTS

| | | | |
|---|---|---|---|
| 3,874,296 | 4/1975 | Hedemark | 342/68 X |
| 3,900,873 | 8/1975 | Bouvier et al. | 342/103 |
| 4,107,679 | 8/1978 | Strauch et al. | 342/87 |
| 4,121,212 | 10/1978 | Taylor, Jr. | 342/201 |
| 4,216,472 | 8/1980 | Albanese | 342/95 |
| 4,225,866 | 9/1980 | Levine | 342/173 |
| 4,241,347 | 12/1980 | Albanese et al. | 342/89 |
| 4,245,346 | 1/1981 | Grady et al. | 455/28 |
| 4,467,284 | 8/1984 | Farkas | 328/61 |
| 4,513,288 | 4/1985 | Weathers et al. | 342/201 |
| 4,566,010 | 1/1986 | Collins | 342/379 X |
| 4,613,990 | 9/1986 | Halpern | 455/33 |
| 4,626,853 | 12/1986 | Lee et al. | 342/132 |
| 4,633,198 | 12/1986 | Goetz et al. | 342/25 X |
| 4,658,436 | 4/1987 | Hill | 380/31 |
| 4,682,173 | 7/1987 | Kotoh et al. | 342/51 |
| 4,686,534 | 8/1987 | Eddy | 342/165 |
| 4,775,995 | 10/1988 | Chapman et al. | 379/58 |
| 4,868,795 | 9/1989 | McDavid et al. | 367/77 |

FOREIGN PATENT DOCUMENTS

| | | |
|---|---|---|
| 1007516 | 10/1965 | United Kingdom. |
| 1047584 | 11/1966 | United Kingdom. |
| 1073024 | 6/1967 | United Kingdom. |
| 1136571 | 12/1968 | United Kingdom. |
| 1140590 | 1/1969 | United Kingdom. |
| 1208582 | 10/1970 | United Kingdom. |
| 1246142 | 9/1971 | United Kingdom. |
| 1309381 | 3/1973 | United Kingdom. |
| 1351096 | 4/1974 | United Kingdom. |
| 1370873 | 10/1974 | United Kingdom. |
| 1380451 | 1/1975 | United Kingdom. |
| 1439713 | 6/1976 | United Kingdom. |
| 1445572 | 8/1976 | United Kingdom. |
| 1474026 | 5/1977 | United Kingdom. |
| 1480423 | 7/1977 | United Kingdom. |
| 1511201 | 5/1978 | United Kingdom. |
| 1514158 | 6/1978 | United Kingdom. |
| 2029150 | 3/1980 | United Kingdom. |
| 1571861 | 7/1980 | United Kingdom. |

*Primary Examiner*—John B. Sotomayor
*Attorney, Agent, or Firm*—Charles J. Ungemach

[57] ABSTRACT

A radar ranging system is disclosed which employs a frequency modulated and phase coded transmission signal which can have up to a 100 percent duty cycle and which performs time tracking of the radar target and does not require extreme accuracy in frequency modulation, or extreme receiving antenna to transmit antenna isolation.

2 Claims, 2 Drawing Sheets 5,115,247

FREQUENCY MODULATED, PHASE CODED RADAR

This application is a continuation-in-part of U.S. patent application Ser. No. 07/156,155, filed Feb. 16, 1988 now abandoned.

BACKGROUND OF THE INVENTION

1. Field of the Invention

This invention relates to radar systems and more particularly to a frequency modulated, phase coded radar system.

2. Description of the Prior Art

Prior radar systems generally fall into one of two classes. In the first class are pulse type systems in which a pulse of radio frequency energy is transmitted to a remote object and the return pulse is detected in the receiver. The time delay between the transmitted pulse and the return pulse is indicative of the range to the remote object. While measurement of this delay time can be made very accurately, the duty cycle of the system is too low and low duty cycle pulsed systems require high peak pulse power which results in high cost and low performance for electronic counter-counter measures. In order to substantially increase the duty cycle, a series of pulses is normally employed, but in order for these pulses to be distinguished, they must be coded in some manner. One form of such a pulse coded system is found in British patent 1,351,096 in which the transmitted signal is a periodically repeated sequence of binary pseudo random, square wave pulses. Another form of coding is described in British patent 1,208,582 which employs a magnetron to produce an output signal whose frequency is dependent upon the load imposed thereon. In order to encode the train of pulses emitted by the magnetron, the phase of the signal is reversed at predetermined points to produce a phase encoded signal.

The second class of radar system commonly found are frequency modulated systems which can have a nearly 100 percent duty cycle. One such frequency modulated system is shown in U.S. Pat. No. 4,107,679 in which a continuous wave oscillator is modulated by a linearly increasing frequency which changes from a first to a second frequency along a sloped ramp periodically. This signal is transmitted to the remote object and the reflected signal will be a similar signal whose frequency increases with time along the same sloped ramp but the return signal is delayed with respect to the transmitted signal by a time which is a function of the distance to the remote object. If the transmitted signal and the return signal are mixed, their difference is a fixed frequency signal whose magnitude is dependent upon the time delay and thus upon the distance to the remote object. Since it is difficult to measure the magnitude of this fixed frequency as an indication of distance, the slope of the ramp signal is continuously changed until a predetermined frequency is reached. Changing the slope of the frequency modulated ramp will also produce a change in the intermediate frequency from the mixer. This changing intermediate frequency is then provided to a narrow band filter from which an output will be obtained only when the output from the mixer is of the predetermined frequency. The time it then takes to sweep the frequency over the required frequency band is also indicative of the distance to the remote object and this can be detected more easily than detecting the actual frequency difference.

A difficulty encountered with the frequency modulated system described above is that linear ramps are quite difficult to generate and system accuracy will be severely affected by non-linearities in the transmitted ramp.

A difficulty for high duty cycle systems with separate transmitter and receiver antennas is that no matter how the transmitter is shielded from the receiver, some direct signal from transmitter to receiver still manages to get through and this becomes more and more of a problem at longer ranges when the reflected signal from the remote object becomes fainter and fainter. At some point, the direct signal from the transmitter to the antenna may produce a false range indication, which could be very dangerous.

BRIEF DESCRIPTION OF THE PRESENT INVENTION

The present invention overcomes the problems in the prior art by superimposing phase code modulation onto a frequency modulated signal so that the resultant signal transmitted by the antenna is allowed to have a substantially 100 percent duty cycle. Furthermore, because it is phase coded, the transmitted signal does not have to have extreme linearity of the frequency modulated ramp since the system accuracy is determined by the accuracy of the time delay imported to the phase code. Further, the isolation problem is solved via internal filtering in the receiver.

DETAILED DESCRIPTION OF THE PREFERRED EMBODIMENT

Figure 1:
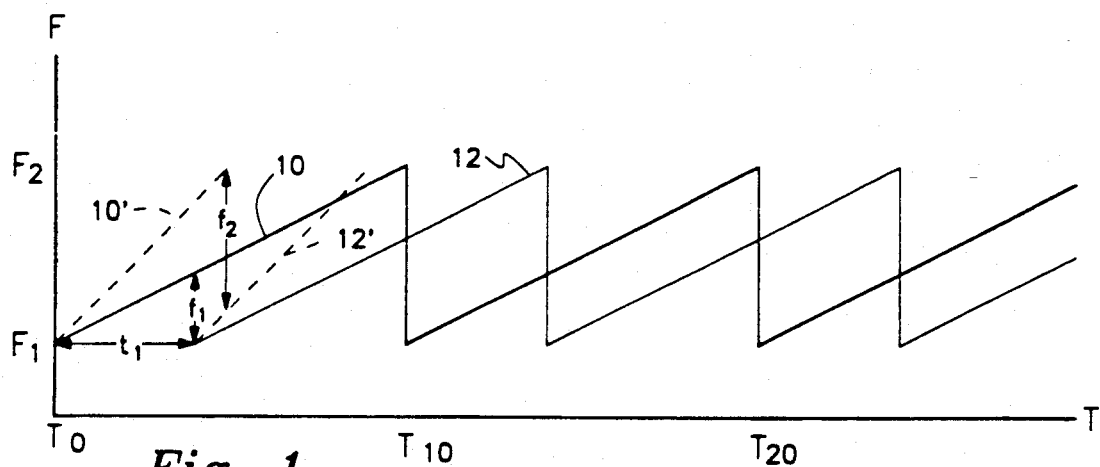
FIG. 1 shows the transmitted and reflected ramps of a frequency modulated signal.

In a frequency modulated radar system such as described in the above-referred to U.S. Pat. No. 4,107,679, a continuous wave oscillator is modulated by a frequency modulator to cause an output signal which varies in frequency over a predetermined time. In FIG. 1, the variation of the signal between a first frequency F1 and a second higher frequency F2 is shown as a heavy line saw-tooth curve 10 which repeats periodically such as at times T10 and T20. Also shown in FIG. 1 is a second saw-tooth curve 12 having the same slope and periodicity as curve 10 but delayed in time by time t1. Curve 12 represents the signal as it is returned from a remote object by reflection and the time t1 will be indicative of that distance. It will also be noted in FIG. 1 that the difference in frequency f1 between curve 10 and curve 12 is fixed since the slope of both ramps 10 and 12 are the same. If curve 12 were to move to the right of FIG. 1 indicating a more remote object, f1 would increase. Similarly, if curve 12 were to move to the left in FIG. 1 indicating a closer object, f1 would decrease. Accordingly, the frequency of the difference between curves 10 and 12 represented by f1 is also indicating of the distance to the remote object.

Figure 2:
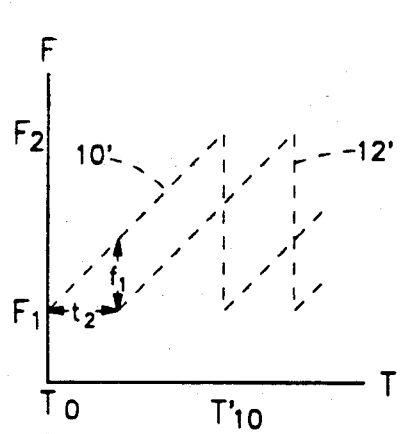
FIG. 2 shows a transmitted and reflected signal similar to FIG. 1 but with the ramp being of different slope.

FIG. 1 also shows a heavy dashed line 10' which represents a signal which changes from the lower frequency F1 to the higher frequency F2 over a shorter period of time so as to have a steeper slope. Dashed line 12' represents the return echo signal from the remote object also having the same slope and periodicity as ramp 10 but delayed by the same time t1 as was the case between curves 10 and 12. Although the delay time for the reflected signal is the same as before indicating that the object is at the same distance, it is seen that the frequency difference f2 between curves 10' and 12' is larger than the frequency difference f1 between curves 10 and 12. If the object were at a closer distance, curve 12' would move to the left in FIG. 1 and the frequency difference represented by f2 would decrease. This situation is shown in FIG. 2 wherein the dashed line 10' is a saw-tooth wave form that repeats after a shorter time period represented by T'10. The return signal 12' is now shown moved to the left in FIG. 2 from the position it occupied in FIG. 1 to a point where the magnitude of the frequency difference is again represented by f1 which is the same frequency difference as between the longer periodic waves 10 and 12 in FIG. 1. It is seen that the return echo, however, now is received at a time t2 which is a shorter time period that t1 in FIG. 1 indicating that the distance to the remote object is now less.

Figure 3:
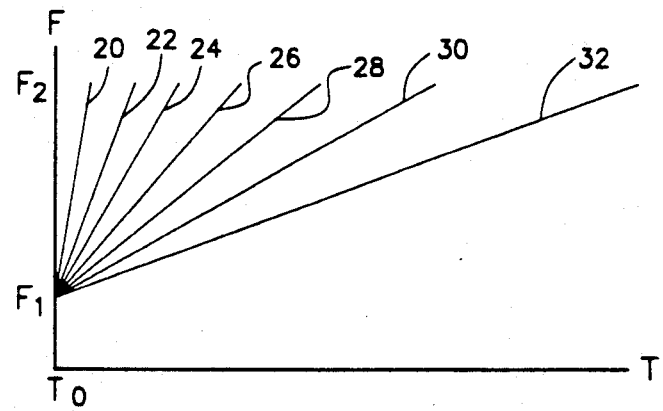
FIG. 3 shows the slopes of a plurality of ramps for the transmitted signal.

It is therefore seen that the distance to the remote object can also be obtained simply by changing the slope of curve 10 until such a time as f1 is of a predetermined value. When the slope of curve 10 reaches this position, it is indicative of the distance to the remote object. Accordingly, as shown in FIG. 3, the slope of the ramp of frequency modulation of the transmitted signal may be changed with time more or less continuously starting with the vertical position and passing through stages such as shown in curves 20, 22, 24, 26, 28, 30, and 32. Somewhere in its course, a frequency f1 will be generated and the time that is taken to sweep from F1 to F2 when f1 is of the predetermined size will be indicative of the distance to the remote object.

Figure 4:
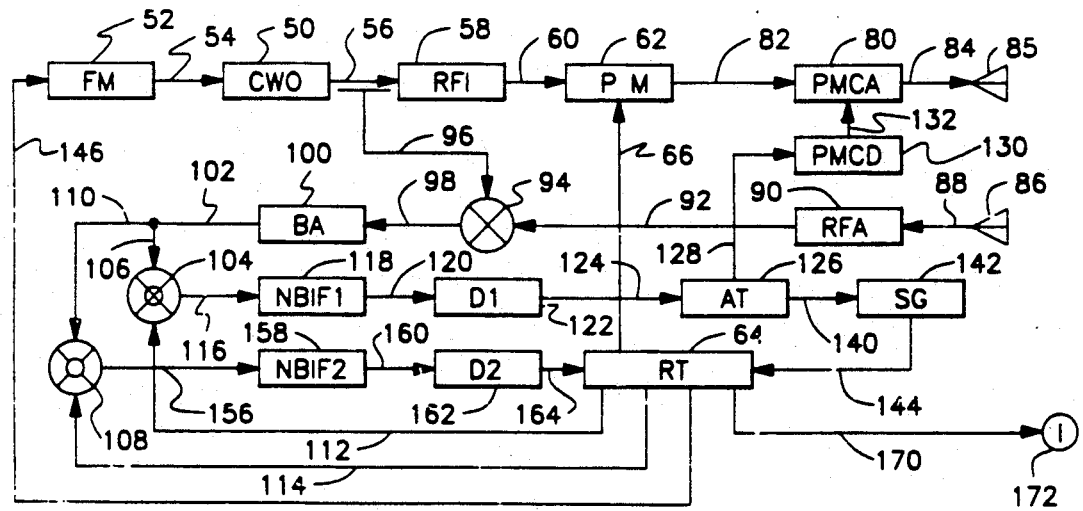
FIG. 4 shows a block schematic diagram of a frequency modulated pulse coded radar system of the present invention.

FIG. 4 shows a block diagram of a radar system of the present invention employing the techniques described in FIGS. 1-3 and further including pulse coding apparatus which produces the advantages of requiring less accuracy in generation of the frequency modulated curves and avoiding the problem associated with direct signals from the transmitter to the receiver.

Figure 5:
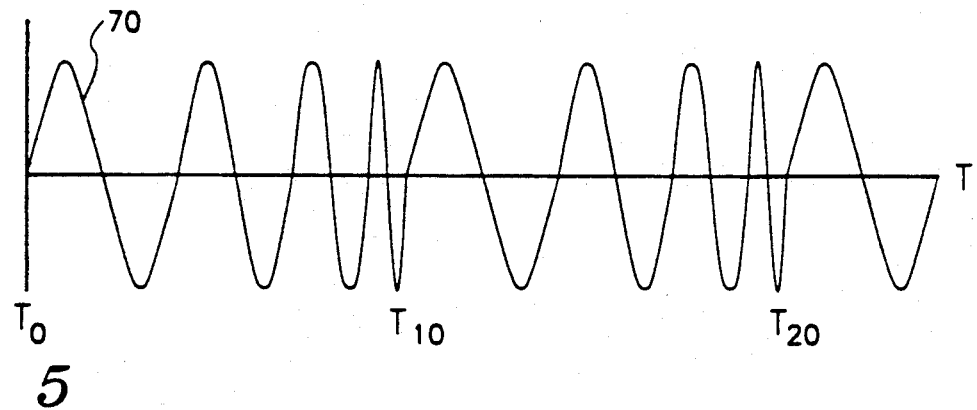
FIG. 5 shows s signal of increasing frequency.

FIG. 4 shows a constant wave oscillator 50 which is frequency modulated by a modulator 52 over a connection shown as arrow 54. The resulting frequency modulated wave is transmitted over a connection shown as arrow 56 to a radio frequency isolator 58 whose purpose is to prevent reflected signals from the downstream circuitry from affecting the signal produced by the oscillator 50. The frequency modulated signal is then presented by a connection shown as arrow 60 to a phase modulator circuit 62 which may be of the circulator type or may be of the balanced mixer type, well known in the art. Phase modulator 62 is controlled by a range tracker 64 over a connection shown as arrow 66 so that the signal from the phase modulator 62 will be a frequency modulated wave which is reversed in phase in accordance with a predetermined code established by tracker 64. The description of these signals can be better understood in connection with FIGS. 5, 6, and 7. In FIG. 5, a frequency modulated wave 70 is shown which increases in frequency from $T_0$ to $T_{10}$ and again from $T_{10}$ to $T_{20}$ as was shown, for example, by the ramp 10 in FIG. 1. This signal would be the signal presented to the phase modulator 62 in FIG. 4.

Figure 6:
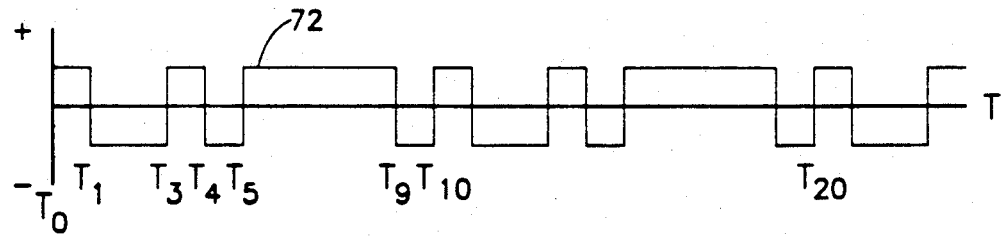
FIG. 6 shows a coded signal for phase reversing the signal of FIG. 5.

FIG. 6 shows a curve 72 which changes polarity with time in accordance with a predetermined code. In the example shown, curve 72 is positive at start time T0 and changes to negative at time T1, back to positive at time T3, back to negative at time T4, back to positive at time T5, back to negative at time T9, and back to positive again at time T10 where it thereafter repeats the cycle. This coding signal represented by curve 72 is presented by the range tracker 64 to the phase modulator 62 so that the signal 70 of FIG. 5 coming in on line 60 to phase modulator 62 of FIG. 4 is reversed in phase in accordance with the code of signal 72. As a result, the signal presented from phase modulator 62 will have an appearance such as shown by curve 70' in FIG. 7 wherein the signal increasing normally to time T1 and then reverses phase so as to increase between times T1 and T3 when it would normally be decreasing. At time T3, it again reverses phase and increases along the normal curve to time T4 where it reverses. Reversals occur again at times T5, T9, and T10 where the cycle repeats. It will be understood that if the signal represented by curve 70' were fed to a second phase modulator which was driven by exactly the same code, then signal 70' would be uncoded and would come out again looking like curve 70 of FIG. 5.

For purposes of explanation use has here been made of a bi-phase code (0°, 180°). This is not a limitation to the invention since any suitable polyphase code will be useful and the appropriate different details are included in the coder and decoder.

Figure 7:
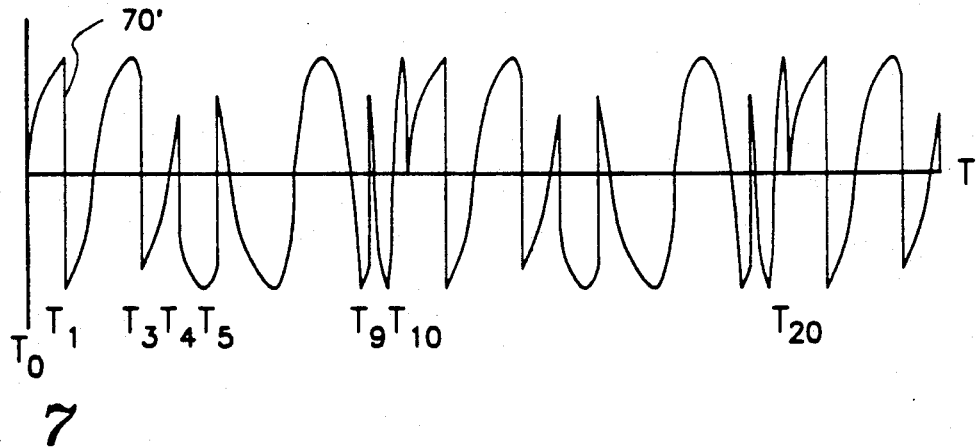
FIG. 7 shows the signal of FIG. 5 phase reversed in accordance with the code of FIG. 6.

Returning to FIG. 4, the output of phase modulator 62 which now appears like the curve 70' in FIG. 7 is presented to a power management control amplifier 80 over a connection shown as arrow 82. The purpose of the power management control 80 is to adjust the power transmitted by the system in accordance with the range to the object because greater power is needed for remote objects than for closer objects and if greater power were used for all objects, unnecessary power would be wasted and the increased power used on near objects would be undesirable from an electronic counter-counter measures standpoint since it would give a larger than necessary signal to enemy radar detectors.

Although of changing power, the output of power management control 80 will continue to be a wave such as shown by curve 70' in FIG. 7 and this is presented to a transmitting antenna 85 over a connection shown as arrow 84. This transmission is sent from antenna 82 to the remote object which, in the case of a radar altimeter, will be the ground, and a return signal will be received by an antenna 85. This echo signal is presented by a connection shown as arrow 88 to a radio frequency amplifier 90 which amplifies the signal and controls the noise characteristics of the receiver. The signals received by amplifier 90 are amplified and presented over a connection shown by arrow 92 to a mixer 94 which also receives an input indicative of the frequency modulated output of oscillator 50 over a connection shown as arrow 96.

Mixer 94 operates on the signals on lines 92 and 96 so as to produce an intermediate frequency signal representative of their frequency difference on a connection shown by arrow 98. This intermediate frequency will correspond to a frequency such as f1 in FIG. 1 although it will still have the phase coding on it as introduced by phase modulator 62. This intermediate frequency signal is presented to a buffer amplifier 100 which produces an amplified intermediate frequency signal on an output 102 which is presented to a first correlator circuit 104 over a connection shown by arrow 106 and to a second correlator circuit 108 over a connection shown by arrow 110.

Correlators 104 and 108 may be like phase modulator 62 comprising a phase modulator of the balance mixer type which operate in accordance with phase coded signals from the range tracker 64 over connections shown as arrows 112 and 114, respectively, to reverse the phase of the incoming signal in accordance with the code shown by curve 72 of FIG. 6. The code is delayed by the inputs from tracker 64 until the incoming signal is decoded and the output from the correlator is a constant frequency signal which is phase reversed. With respect to correlator 104, the signal from range tracker 64 operates to undo the code which was introduced by phase modulator 62 so that an uncoded signal of the intermediate frequency appears on an output connection shown as arrow 116. This signal is presented to a first narrow band intermediate frequency filter 118. Filter 118 is a fairly broad narrow band filter which will pass the frequency f1 and a few frequencies on either side of f1. Filter 118 operates to acquire the peak of the signal of intermediate frequency when that frequency has approached frequency f1 in FIG. 1. As was mentioned above, by changing the slope of the transmitted frequency, a point will be reached where the fixed intermediate frequency will equal a predetermined value and the time to sweep from F1 to F2 at this particular slope will be indicative of the distance to the remote object. Since filter 118 is relatively wide for a narrow band filter, as soon as the intermediate frequency from correlator 104 approaches the proper value, a signal will be produced by filter 118 on a line such as shown by arrow 120 to a detector 122 identified as D1. Detector 122 senses the transmission of a signal in the correct frequency from filter 118 and produces an output on a line shown by arrow 124 to indicate that acquisition of the remote object has been obtained. This signal is presented to an acquisition threshold 126 which, as will be explained, stops the changing of the slope of frequency modulator 52 and freezes the code time delay set by the range tracker 64. When the threshold 126 receives the signal from detector 122, it produces an output indicative of the fact that the range to the remote object has been found. The magnitude of this signal is indicative of the amount of reflected energy from the remote object and accordingly, the magnitude may be used to set the proper power management control. This is, if the magnitude of the signal from detector 122 is too small, the power from amplifier 80 may be increased but if the magnitude of the signal from the detector 122 is too large, the power from amplifier 80 may be decreased. Acquisition threshold 126 accordingly produces a first output signal on a connection shown by arrow 128 to a power management control drive 130. Drive 130 provides an output on a line shown by arrow 132 to the power management control amplifier 80 which operates to control the power of the output signal in accordance with a predetermined limitation on the magnitude of the signal on line 124. A second output from the acquisition threshold 126 operable to switch the system from a search mode to a tracking mode is presented on a line shown by arrow 140 to a search generator 142. Search generator 142 has, up to this time, produced an output on a line 144 which is connected to the range tracker 64 has blocked the signals from the second correlator 108 as will be described. The range tracker 64 is connected to the frequency modulator 52 by a connection shown as arrow 146 and in accordance with the signal from search generator 142 has been changing the ramp slope of the frequency modulation of oscillator 52. In other words, at the beginning of the process of acquiring a remote object, search generator 142 and range tracker 64 operating over connections 144 and 146 cause the frequency modulator 52 to change the slope of its output in accordance with time so as to be able to acquire the remote target. When the target is acquired as evidenced by the signal from detector 122, the output of signal generator 142 stops and a controlling signal from the second correlator 108 starts as will be explained. At the same time the range tracker 64 fixes the delay of the code signals on lines 112 and 114 relative to the code on line 66 an amount corresponding to the range delay time t1 in FIG. 1. The range delay time and the modulation slope are, therefore, rigidly releated and they both represent the distance to the target. At the time the search generator 142 turns itself off, correlator 108 which receives the coded intermediate frequency over connection 110 and the properly delayed code over connection 114 produces an uncoded signal, just as correlator 104 did, on a connection shown by arrow 156 to a second narrow band intermediate frequency filter 158 which has a narrower frequency band. Because of the narrower frequency band, when a signal is first produced by correlator 104, correlator 108 produces a smaller but still definite output. This output signal is presented on a connection shown by arrow 160 to a second detector 162. Detector 162 detects that the code delay is proper and that the intermediate frequency has now reached the f1 value which passes through the filter 158, and produces a signal on a connection shown by arrow 164 to the range tracker 64 which will then keep adjusting the slope and the code delay so as to more accurately bring the intermediate frequency to the value passed by filter 158 and will thereafter follow the remote target in range by appropriate adjustments to the code delay and the slope. In other words, after the initial acquisition of the target, by correlator 104 the change of ramp slope and change in code delay from the range tracker 64 to the frequency modulator 52 is continued until the intermediate frequency on line 156 which has been decoded by correlator 108 reaches the frequency set by filter 158. At this time, the range tracker 64 which has an internal clock has measured the code time delay and has thus accurately determined the range to the remote object and an output indicative of this range is presented from the range tracker 64 over an output shown by arrow 170 to an appropriate indicator 172 to provide an indication of the range to the object.

It should be noted that at high ranges, the frequency passed by filters 118 and 158 automatically discriminate against signal leakage from antenna 82 to antenna 86 because these are a much shorter time delay. Therefore, the problem encountered in prior art systems at higher ranges is automatically overcome.

It is therefore seen that I have provided an improved radar ranging circuit which can operate on a substantially 100 percent duty cycle and bases its measurement as measurement of time and yet which avoids the problems of direct transmission between transmitting antenna and receiving antennas typically found in pulsed systems and does not require extreme accuracy in generating the frequency modulator ramp since the accuracy of the system is based on the clock generating the time delay on the correlator code.

Many changes to the apparatus shown in connection with the description of the preferred embodiment will occur to those skilled in the art. For example, while I have described the range tracker as containing a built-in clock, an external clock could be connected thereto. The power management control is not necessary if power and secrecy are not considerations and other components described may be modified or eliminated without departing from the scope of my invention. I therefore do not intend to be limited by the specific disclosures used in connection with the preferred embodiment but intend only to be limited by the following claims.

The embodiments of the invention in which an exclusive property or right is claimed are defined as follows:

1. Radar ranging apparatus comprising:
    transmission means including (i) modulating means for generating a frequency modulated signal where the frequency changes from a first value to a second value along a substantially linearly sloped curve, (ii) phase coding means for reversing the phase of the frequency modulated signal at predetermined times according to a predetermined code, the transmission means operable to transmit the frequency modulated phase coded signal to a remote object, and operable to vary the power of the transmitted signal in accordance with a power management signal;
    receiver means including (i) mixer means connected to the transmission means to receive frequency modulated signals therefrom and connected to receive signals reflected from the object, such reflected signals being delayed with respect to the transmitted signals by a time which varies with the distance to the object, the mixer means providing a coded intermediate frequency signal of a substantially constant frequency which frequency is dependent upon the slope of the substantially linearly sloped curved, and (ii) correlator means connected to the phase coding means and to the mixer means to receive the intermediate frequency signal therefrom, the correlator means operable to remove the code from the intermediate frequency signal to produce an uncoded signal of the substantially constant frequency;
    tracking means connected to the correlator means to change the time delay of the correlation code relative to the transmitted code, the tracking means responsive to the decoded intermediate frequency from the correlator means to produce an output indicative of the distance to the object; and
    power management means operable to produce the power management signal in response to the reflected signal received by the receiver means and connected to supply the power management signal to the transmission means, the power management signal being characterized to control the power of the transmitted frequency modulated phase coded signal as a predetermined function of the distance to the remote object.

2. Apparatus according to claim 1, wherein the receiver means further includes, (iii) second correlator means connected to the phase coding means and to the mixer means to receive the intermediate frequency signal therefrom, the second correlator operable to remove the code from the intermediate frequency signal to produce a second uncoded signal, the amplitude of which is used to control the power management means in order to emit the least possible amount of RF power, the tracking means operable subsequent to the reception of a signal decoded by the correlation means to adjust the code time delay to track the target.

* * * * *